US010145427B2

(12) United States Patent
Li et al.

(10) Patent No.: US 10,145,427 B2
(45) Date of Patent: Dec. 4, 2018

(54) FLUID DRIVING DEVICE, MOTOR ASSEMBLY AND CENTRIFUGAL FRICTION CLUTCH THEREOF

(71) Applicant: Johnson Electric S.A., Murten (CH)

(72) Inventors: Yue Li, Hong Kong (CN); Li Sheng Liu, Shen Zhen (CN); Yong Wang, Shen Zhen (CN); Ya Ming Zhang, Shen Zhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 28 days.

(21) Appl. No.: 15/255,721

(22) Filed: Sep. 2, 2016

(65) Prior Publication Data

US 2017/0058972 A1 Mar. 2, 2017

(30) Foreign Application Priority Data

Sep. 2, 2015 (CN) .......................... 2015 1 0561023

(51) Int. Cl.
  *F16D 43/18* (2006.01)
  *F04D 25/08* (2006.01)
  (Continued)

(52) U.S. Cl.
  CPC ........... *F16D 43/18* (2013.01); *F04D 25/022* (2013.01); *F04D 25/08* (2013.01); *H02K 7/003* (2013.01); *H02K 7/108* (2013.01); *H02K 7/14* (2013.01); *F04D 29/282* (2013.01); *F05D 2260/4023* (2013.01)

(58) Field of Classification Search
  USPC ..................................................... 192/105 BA
  See application file for complete search history.

(56) References Cited

U.S. PATENT DOCUMENTS

| 1,032,524 A | * | 7/1912 | Wiard | ..................... F16D 43/18 |
| | | | | 192/105 BA |
| 1,659,286 A | * | 2/1928 | Wallace | ................. F16D 43/18 |
| | | | | 192/105 BA |

(Continued)

FOREIGN PATENT DOCUMENTS

| GB | 214958 A | 10/1924 |
| GB | 241242 A | 10/1925 |

*Primary Examiner* — Mark A Manley
(74) *Attorney, Agent, or Firm* — Muncy, Geissler, Olds & Lowe, PC

(57) ABSTRACT

A blower, a motor assembly and a centrifugal friction clutch thereof are provided. The centrifugal friction clutch includes: a fixing member for being fixed on a rotary shaft and comprising a guiding groove disposed in a radial direction of the fixing member and passing through an outer circumferential surface of the fixing member; a centrifugal block disposed in the guiding groove and slidable in the guiding groove; and a loading wheel having an inner hole in which the fixing member is received. A gap between a wall of the inner hole and the outer circumferential surface of the fixing member is less than a length of the centrifugal block along its sliding direction. The centrifugal friction clutch reduces vibrations at startup of the motor, thereby effectively reducing the vibrational noise. In addition, this also avoids the startup failure of the motor and effectively improves the startup performance of the motor.

12 Claims, 3 Drawing Sheets

(51) Int. Cl.
    *F04D 25/02*     (2006.01)
    *H02K 7/14*      (2006.01)
    *H02K 7/00*      (2006.01)
    *H02K 7/108*     (2006.01)
    *F04D 29/28*     (2006.01)

(56)  References Cited

U.S. PATENT DOCUMENTS

| | | | | | |
|---|---|---|---|---|---|
| 3,429,411 | A | * | 2/1969 | Hazzard | F16D 43/22 |
| | | | | | 192/105 CD |
| 4,926,986 | A | * | 5/1990 | Noel | F16D 43/14 |
| | | | | | 477/14 |
| 5,056,633 | A | * | 10/1991 | Noel | F16D 43/14 |
| | | | | | 192/103 B |
| 5,665,018 | A | * | 9/1997 | Miyata | F02B 67/06 |
| | | | | | 474/74 |
| 2011/0005888 | A1 | * | 1/2011 | Martinsson | B27B 17/10 |
| | | | | | 192/103 R |

* cited by examiner

FLUID DRIVING DEVICE, MOTOR ASSEMBLY AND CENTRIFUGAL FRICTION CLUTCH THEREOF

CROSS REFERENCE TO RELATED APPLICATIONS

This non-provisional patent application claims priority under 35 U.S.C. § 119(a) from Patent Application No. 201510561023.4 filed in The People's Republic of China on Sep. 2, 2015.

FIELD OF THE INVENTION

This invention relates to the field of fluid driving devices, and in particular to a blower, a motor assembly, and a centrifugal friction clutch of the blower and motor assembly.

BACKGROUND OF THE INVENTION

In a fluid driving device, such as a blower, a motor connects with an impeller to drive the impeller to rotation during operation. At startup of a single phase motor, the startup torque of the motor is small and fluctuates greatly. However, the impeller is stationary at its initial state, which requires the motor to have a large rotational inertia and startup load torque. As a result, vibrations may easily occur during startup of the motor; or even worse, motor startup failure may occur.

In a typical method of starting the single phase motor under load, a friction startup device is used to firstly drive the motor to rotate, which in turn progressively drives the impeller to rotate. Currently, the friction startup device consists of arcuate plates and an annular spring. Multiple arcuate plates are disposed on the impeller and are located on the same circle. The annular spring surrounds outer sides of the multiple arcuate plates. An end portion of a rotary shaft of the motor extends into a hole cooperatively defined by the multiple arcuate plates. As the rotary shaft of the motor rotates, the annular spring applies a constraint force to the multiple arcuate plates so that a friction force is generated between the arcuate plates and the rotary shaft. However, the friction force generated in this construction changes little with the change of the rotational speed, which is adverse to reducing of the rotational inertia and the startup load at the beginning of the startup and hence cannot effectively address vibrations and startup failure during the motor startup.

Therefore, it is urgently desired to reduce the rotational inertia and startup load applied to the rotary shaft during the motor startup to reduce the damage caused by the motor vibrations and startup failure.

SUMMARY OF THE INVENTION

Thus, there is a desire for a centrifugal friction clutch for reducing the rotational inertia and startup load torque applied to the rotary shaft to improve the startup performance. There is also a desire for a motor assembly and a fluid driving device employing the above centrifugal friction clutch.

In order to achieve the above objective, the prevent invention provides the following technical solution: a centrifugal friction clutch comprises: a fixing member for being fixed on a rotary shaft, the fixing member defining at least one guiding groove extending in a radial direction of the fixing member and passing through an outer circumferential surface of the fixing member; at least one centrifugal block correspondingly slidably received in said at least one guiding groove; and a loading wheel having an inner hole in which the fixing member is received, a gap between a wall of the inner hole and the outer circumferential surface of the fixing member being less than a length of each of said at least one centrifugal block along its sliding direction.

Preferably, in the centrifugal friction clutch, the fixing member comprises: a positioning shaft sleeve for being fastened to the rotary shaft; a support portion comprising the guiding groove, the support portion having a connecting hole for achieving circumferential positioning between the support portion and the positioning shaft sleeve; and a first stop plate fixedly connected with the positioning shaft sleeve for axially positioning the support portion.

Preferably, in the centrifugal friction clutch, the positioning shaft sleeve and the first stop plate are an integral structure.

Preferably, in the centrifugal friction clutch, a part of the positioning shaft sleeve extending into a connecting hole of the support portion is of a non-circular structure, and the connecting hole is a non-circular hole matching with the non-circular structure.

Preferably, in the centrifugal friction clutch, the part of the positioning shaft sleeve extending into the connecting hole of the support portion is of a prism structure.

Preferably, in the centrifugal friction clutch, the support portion is a circular cylindrical structure with a constant diameter, the inner hole of the loading wheel is a circular inner hole matching with the support portion, and an end face of each of said at least one centrifugal block toward an outer side of the support portion is a convex arc surface.

Preferably, in the centrifugal friction clutch, the convex arc surface has the same curvature radius as the wall of the inner hole and is coaxially arranged with the inner hole of the loading wheel.

Preferably, in the centrifugal friction clutch, the inner hole of the loading wheel is a stepped hole, the support portion is disposed in a large-diameter hole of the stepped hole, and an end face of the support portion away from the first stop plate contacts a step end face of the stepped hole.

Preferably, in the centrifugal friction clutch, the inner hole of the loading wheel is a circular cylindrical hole, and one end of the support portion away from the first stop plate is provided with a second stop plate for being fixed on the rotary shaft.

Preferably, in the centrifugal friction clutch, an elastic washer is provided at one end of each of said at least one centrifugal block toward a radial inner side of the support portion.

Preferably, in the centrifugal friction clutch, the fixing member is an integral structure.

Preferably, in the centrifugal friction clutch, the loading wheel is provided with latching grooves for latching with a load.

Preferably, in the centrifugal friction clutch, said at least one guiding grooves comprises two or more guiding grooves evenly arranged at the fixing member in an circumferential direction of the fixing member.

The present invention further provides a motor assembly comprising a single phase motor. The motor assembly further comprises a centrifugal friction clutch in accordance with any of above centrifugal friction clutches.

Preferably, the motor assembly further comprises a position-limiting member disposed on the rotary shaft of the motor to limit axial movement of the impeller, and the position-limiting member is disposed at one side of the centrifugal friction clutch opposite from the motor.

The present invention further provides a fluid driving device comprising an impeller and a single phase motor assembly. The single phase motor assembly is a single phase motor assembly in accordance with any of the above single phase motor assemblies.

As can be seen from the above technical solutions, in the centrifugal friction clutch of the present invention, the fixing member rotates with the rotary shaft during startup of the motor, and the centrifugal blocks move toward the loading wheel under the guide of the guiding grooves. When the rotational speed of the rotary shaft is relatively low, the centrifugal blocks are subject to a very small centrifugal force while rotating with the fixing member. As a result, the centrifugal blocks apply a very small pressing force to the wall of the inner hole of the loading wheel, such that a very small frictional force is generated between the centrifugal blocks and the loading wheel. As the rotational speed of the rotary shaft increases, the centrifugal force applied to the centrifugal blocks significantly increases and, accordingly, the frictional force between the centrifugal blocks and the loading wheel is significantly increased. By means of the friction clutch as configured above, the frictional force between the centrifugal blocks and the loading wheel is very small at startup of the motor (the rotational speed of the rotary shaft is low). The loading wheel and the impeller are fixedly connected, and the impeller is stationary at the motor startup. Therefore, the centrifugal blocks and the loading wheel form a sliding friction pair, and a relative sliding movement thus takes place between the fixing member and the loading wheel. As the rotational speed of the rotary shaft of the motor increases, the centrifugal force of the centrifugal blocks increases, and the frictional force between the centrifugal blocks and the loading wheel also increases. As a result, the amount of relative sliding movement between the centrifugal blocks and the loading wheel decreases until the centrifugal blocks and the loading wheel become stationary relative to each other, in which case the rotational speed of the loading wheel gradually increases to the synchronous speed of the motor. In the centrifugal friction clutch of the present embodiment, the frictional force between the centrifugal blocks and the loading wheel is directly proportional to the square of the rotational speed of the rotary shaft. When at low speed (startup of the motor), the relative sliding movement takes place between the fixing member and the loading wheel, which reduces the rotational inertia and startup load torque applied to the rotary shaft, and reduces the vibrations at startup of the motor, thereby effectively reducing the vibrational noise. In addition, this also avoids the startup failure of the motor and effectively improves the startup performance of the motor.

The motor assembly and the fluid driving device of the present invention include the above-described centrifugal friction clutch and, therefore, should be able to achieve the same technical results, which are not described further herein in detail.

BRIEF DESCRIPTION OF THE DRAWINGS

In order to more clearly describe the technical solutions in the prior art or the embodiments of the present invention, the accompanying drawings to be used in the descriptions of the prior art or the embodiments are briefly introduced as follows. Obviously, the following accompanying drawings just illustrate some embodiments of the present invention, and people skilled in the art can obtain other drawings from these drawings without paying creative efforts.

COMPONENT LIST

Figure 1:
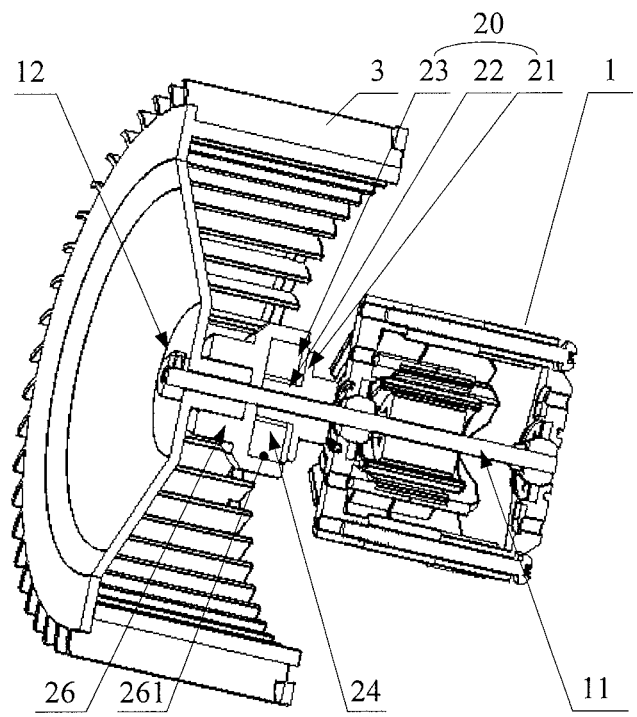
FIG. 1 is a sectional view of a fluid driving device according to one embodiment of the present invention.

Motor 1
Rotary shaft 11
Position-limiting member 12
Fastening screw 13
Centrifugal friction clutch 2
Fixing member 20
First stop plate 21
Positioning shaft sleeve 22
Support portion 23
Centrifugal block 24
Elastic washer 25
Loading wheel 26
Latching groove 27
Second stop plate 28
Guiding groove 29
Impeller 3

DETAILED DESCRIPTION OF THE PREFERRED EMBODIMENTS

The present invention discloses a centrifugal friction clutch which reduces the rotational inertia and startup load torque applied to the rotary shaft to improve the startup performance. The present invention further discloses a motor assembly and a fluid driving device employing the above centrifugal friction clutch.

The technical solutions of the embodiments of the present invention will be clearly and completely described as follows with reference to the accompanying drawings. Apparently, the embodiments as described below are merely part of, rather than all, embodiments of the present invention. Based on the embodiments of the present disclosure, any other embodiment obtained by a person skilled in the art without paying any creative effort shall fall within the protection scope of the present invention.

Figure 2:
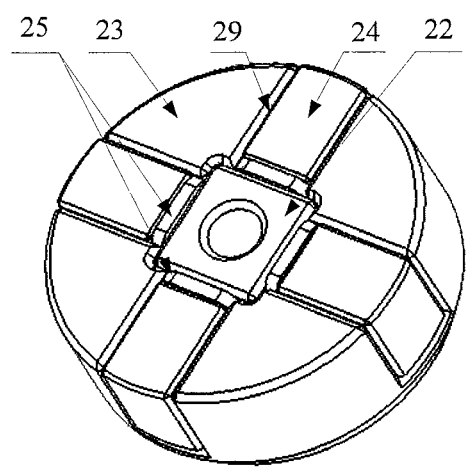
FIG. 2 is an assembled view of a support portion, centrifugal blocks and elastic washers of the centrifugal friction clutch of the embodiment of the present invention.
Figure 3:
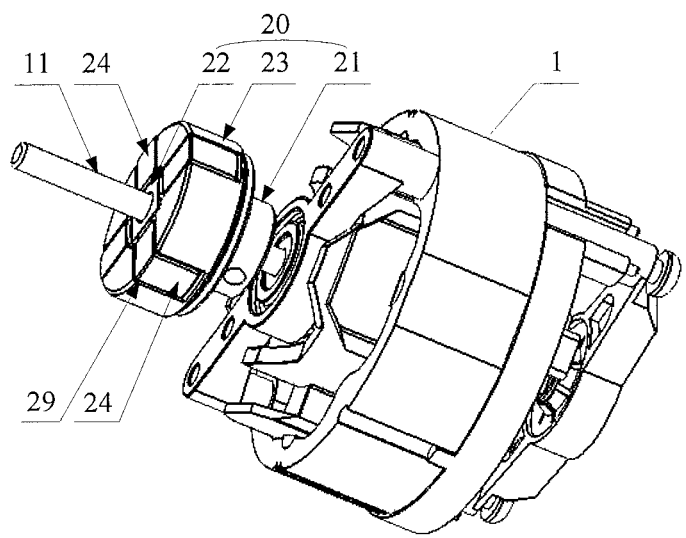
FIG. 3 is an exploded view of a motor assembly of the embodiment of the present invention.

FIG. 1 is a sectional view of a fluid driving device in accordance with one embodiment of the present invention. FIG. 2 is an assembled view of a support portion, centrifugal blocks and elastic washers of a centrifugal friction clutch. FIG. 3 is an exploded view of a motor assembly in accordance with one embodiment of the present invention.

A centrifugal friction clutch for use in motor startup under load in accordance with one embodiment of the present invention includes a fixing member 20, a plurality of centrifugal blocks 24, and a loading wheel 26. The fixing member 20 is fixed on a rotary shaft 11 of a motor 1. In addition, the fixing member 20 defines a plurality of guiding grooves 29 that respectively extend in radial a direction of the fixing member 20 and through an outer circumferential surface of the fixing member 20. The centrifugal blocks 24 are slidably received in the guiding grooves 29. Therefore, the centrifugal blocks 24 may extend out of the outer circumferential surface of the fixing member 20 along the corresponding guiding grooves 29. The loading wheel 26 is used to fixedly connect with an impeller 3. The loading wheel 26 has an inner hole 261 in which the fixing member 20 is received. A gap between a wall of the inner hole 261 and the outer circumferential surface of the fixing member 20 is less than a length of each of the centrifugal block 24 along its sliding direction. As such, the centrifugal blocks 24 will not fall from the gap between the wall of the inner hole 261 and the outer circumferential surface of the fixing member 20.

It should be understood that the outer circumferential surface of the fixing member 20 is an outer surface extending along the axial direction of the rotary shaft 11. Taking a cylindrical fixing member as an example, the outer circumferential surface of the fixing member 20 is the cylindrical outer surface. Preferably, the gap between the wall of the inner hole 261 and the outer circumferential surface of the fixing member 20 ranges between 0 and 0.05 mm.

In the centrifugal friction clutch of the present embodiment, the fixing member 20 rotates with the rotary shaft 11 during startup of the motor 1, and the centrifugal blocks 24 move toward the loading wheel under the guide of the guiding grooves 29. When the rotational speed of the rotary shaft 11 is very low, the centrifugal blocks 24 is subject to a very small centrifugal force while rotating with the fixing member 20. As a result, the centrifugal blocks 24 apply a very small pressing force onto the wall of the inner hole 261 of the loading wheel 26, such that a very small frictional force is generated between the centrifugal blocks 24 and the loading wheel 26. As the rotational speed of the rotary shaft 11 increases, the centrifugal force applied to the centrifugal blocks 24 significantly increases and, accordingly, the frictional force between the centrifugal blocks 24 and the loading wheel 26 is significantly increased. By means of the friction clutch as configured above, the frictional force between the centrifugal blocks 24 and the loading wheel 26 is very small at startup of the motor 1 (the rotational speed of the rotary shaft 11 is low). The loading wheel 26 and the impeller 3 are fixedly connected, and the impeller 3 is stationary at the motor startup. Therefore, the centrifugal block 24 and the loading wheel 26 form a sliding friction pair, and a relative sliding movement thus takes place between the fixing member 20 and the loading wheel 26. As the rotational speed of the rotary shaft 11 of the motor 1 increases, the centrifugal force of the centrifugal blocks 24 increases, and the frictional force between the centrifugal blocks 24 and the loading wheel 26 also increases. As a result, the amount of relative sliding movement between the centrifugal block 24 and the loading wheel 26 decreases until the centrifugal block 24 and the loading wheel 26 become stationary relative to each other, in which case the rotational speed of the loading wheel 26 gradually increases to the synchronous speed of the motor. In the centrifugal friction clutch of the present embodiment, the frictional force between the centrifugal blocks 24 and the loading wheel 26 is directly proportional to a square of the rotational speed of the rotary shaft 11. When at low speed (startup of the motor 1), the relative sliding movement takes place between the fixing member 20 and the loading wheel 26, which reduces the rotational inertia and startup load torque applied to the rotary shaft 11, and reduces the vibrations at startup of the motor 1, thereby effectively reducing the vibrational noise. In addition, this also avoids the startup failure of the motor 1 and effectively improves the startup performance of the motor 1.

The fixing member 20 is fixedly connected to the rotary shaft 11 by means of screws, pins, rivets or adhesive, which is not described herein in detail.

Figure 4:
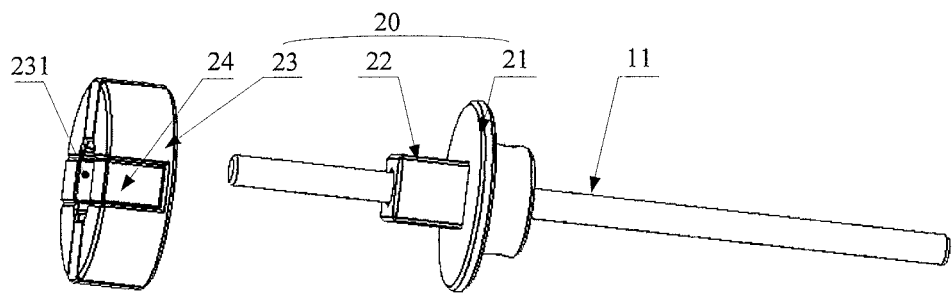
FIG. 4 is an exploded view of the centrifugal friction clutch of the embodiment of the present invention.

Referring to FIG. 4, in this embodiment, the fixing member 20 of the centrifugal friction clutch includes a first stop plate 21, a positioning shaft sleeve 22, and a support portion 23. The positioning shaft sleeve 22 is fastened to the rotary shaft 11. The guiding grooves 29 are defined in the support portion 23. Therefore, the outer circumferential surface of the fixing member 20 is the outer circumferential surface of the support portion 23, and the guiding grooves 29 pass through the outer circumferential surface of the support portion 23. The support portion 23 is connected to the positioning shaft sleeve 22 by a connecting hole 231 of the support portion 23.

The first stop plate 21 is fixedly connected to the positioning shaft sleeve 22, for positioning the support portion 23. In mounting of the centrifugal friction clutch of the present embodiment to the rotary shaft 11 of the motor 1, the positioning shaft sleeve 22 and the first stop plate 21 are fixedly mounted to the rotary shaft 11, and the support portion 23 is then mounted to the rotary shaft 11, such that the positioning shaft sleeve 22 passes through the connecting hole 231 of the support portion 23 to circumferentially position the support portion 23, and one end of the support portion 23 abuts against the first stop plate 21 so as to be axially positioned. The centrifugal blocks 24 are respectively mounted in the guiding grooves 29 of the support portion 23. The loading wheel 26 is then attached to and cover an outer side of the support portion 23, such that the support portion 23 and the centrifugal blocks 24 are axially positioned by the loading wheel 26. The above configuration achieves the positioning of the support portion 23 and facilitates the mounting of the fixing member 20.

Specifically, the positioning shaft sleeve 22 and the first stop plate 21 are formed into an integral structure. With the positioning shaft sleeve 22 and the first stop plate 21 formed into an integral structure, only one of the positioning shaft sleeve 22 and the first stop plate 21 needs to be fixed relative to the rotary shaft. In addition, separate fabrication and mounting of the positioning shaft sleeve 22 and the first stop plate 21 are avoided, which facilitates the assembly. In this embodiment, the positioning shaft sleeve 22 is fixed to the rotary shaft 11 preferably through pins. In the centrifugal friction clutch of this embodiment, a part of the positioning shaft sleeve 22 extending into the connecting hole 231 of the support portion 23 is of a non-circular structure, and the connecting hole 231 is a non-circular hole that matches with the structure of the positioning shaft sleeve 22. That is, the part of the positioning shaft sleeve 22 extending into the connecting hole 231 of the support portion 23 has a non-circular cross-section, and the connecting hole 231 has a shape matching with the shape of the cross-section of the positioning shaft sleeve 22, thereby further facilitating the circumferential positioning of the support portion 23. In an alternative embodiment, the positioning shaft sleeve 22 may be configured to be a circular cylindrical structure, the connecting hole 231 is configured to be a circular hole, and circumferential positioning between the positioning shaft sleeve and the connecting hole 231 may be achieved by an interference fit therebetween.

Specifically, the part of the positioning shaft sleeve 22 extending into the connecting hole 231 of the support portion 23 is of a prism structure, and the connecting hole 231 is a polygonal hole matching with the prism structure. The engagement between the connecting hole 231 and the prism structure effectively achieves the circumferential positioning between the positioning sleeve 22 and the support portion 23. Alternatively, the part of the positioning shaft sleeve 22 extending into the connecting hole 231 of the support portion 23 may also be of another non-circular structure such as, for example, crescent-shaped or oval-shaped structure.

The support portion 23 is of a cylindrical structure, and the connecting hole 231 is formed to be coaxial with the support portion 23. As such, the support portion 23 and the rotary shaft 11 are coaxially disposed, which improves stableness of the rotation of the support portion 23. The inner hole 261 of the loading wheel 26 is a circular inner hole matching with the support portion 23. An end face of each of the centrifugal blocks 24 toward the outer side of the support portion 23 is a convex arc surface having the same curvature radius as the wall of the inner hole 261 and coaxially arranged with the inner hole 261. By designing the end face as the convex arc surface, the end face contacts the wall of the inner hole 261, which reduces friction loss of the end of the centrifugal block 24 in contact with the loading wheel 26.

As described above, the convex arc surface has the same curvature radius as the wall of the inner hole 261 and is coaxially arranged with the inner hole 261. Through this configuration, each of the centrifugal block 24 is made in a surface-to-surface contact with the loading wheel 26, which increases the contact area between the centrifugal block 24 and the loading wheel 26 and hence facilitates the generation of the frictional force therebetween.

Alternatively, the support portion 23 may also be integrally formed with the positioning shaft sleeve 22 and the first stop plate 21.

Specifically, in this embodiment, the number of the guiding grooves 29 is four, with two adjacent guiding grooves 29 forming an angle of 90 degrees therebetween. Alternatively, the number of the guiding grooves 29 can also be another value such as three, two, or more than five.

When the motor 1 rotates at low speed, the centrifugal blocks 24 have small centrifugal force. Therefore, striking between the centrifugal blocks 24 and the support portion 23 inevitably occurs under the influence of the gravity. In order to reduce noises generated by the striking between the centrifugal blocks 24 and the support portion 23, referring to FIG. 2, an elastic washer 25 is disposed at a radial inner side of each of the centrifugal block 24 toward the support portion 23 in this embodiment. The elastic washers 25 may be made of felt or silicone rubber.

Further, lubricating grease may be disposed among the centrifugal blocks 24, guiding grooves 29, support portion 23 and loading wheel 26, which enhances the heat dissipation result while providing a lubricating result to reduce friction loss.

Referring to FIG. 1, in the first embodiment, the inner hole 261 of the loading wheel 26 is a stepped hole having coaxially arranged large-diameter hole and small-diameter hole. The support portion 23 is disposed within the large-diameter hole. An end face of the support portion 23 away from the first stop plate 21 abuts against a step end face of the stepped hole. The small-diameter hole allows the rotary shaft 11 to pass therethrough.

Figure 5:
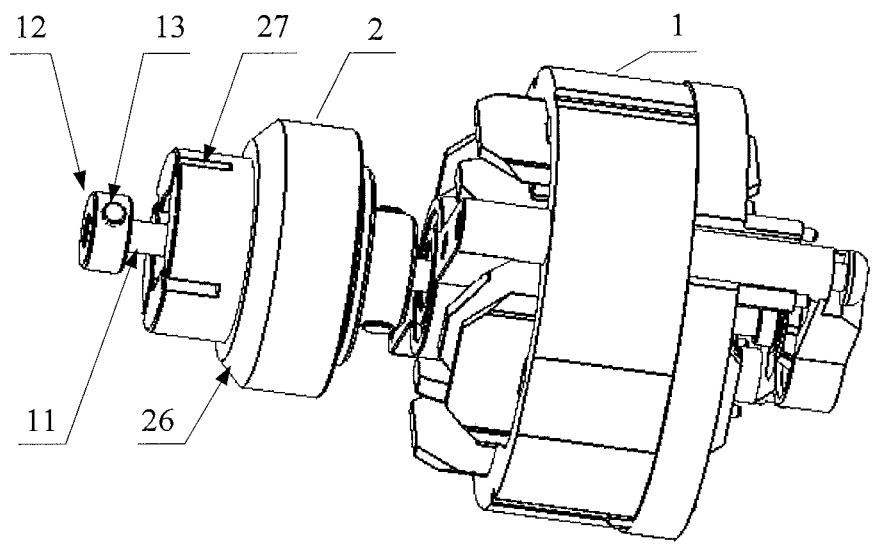
FIG. 5 illustrates the fluid driving device of FIG. 1, with an impeller removed.

Referring to FIG. 5, in order to ensure the circumferential positioning between the loading wheel 26 and the impeller 3, the loading wheel 26 is formed with latching grooves 27 for latching with the load. Alternatively, circumferential positioning between the loading wheel 26 and the impeller 3 may also be achieved by using bolts, pins, rivets or adhesive.

The latching grooves 27 are formed in an outer surface of the loading wheel 26. In order for engagement between the impeller 3 and the latching grooves 27 of the loading wheel 26, the impeller 3 forms protrusions for engaging with the latching grooves 27. In another embodiment, protruding structures may be provided on the loading wheel, and corresponding latching grooves are provided on the impeller.

Referring to FIG. 5, in order to facilitate the axial positioning of the impeller, the motor assembly in accordance with the embodiment of the present invention further includes a position-limiting member 12 disposed on the rotary shaft 11 of the motor 1 to limit axial movement of the impeller 3. The position-limiting member 12 is disposed at one side of the centrifugal friction clutch 2 opposite from the motor 1.

The position-limiting member 12 is positioned on the rotary shaft 11 with a fastening screw 13. In an alternative embodiment, the position-limiting member 12 may also be configured to be a nut, and an end portion of the rotary shaft 11 is provided with threads for engaging with the nut. In still another embodiment, the position-limiting member 12 may be configured to be a clip spring, and the end portion of the rotary shaft 11 is provided with a latching groove for engaging with the clip spring. The position-limiting member 12 can be implemented as other suitable structures that fall within the scope of the present invention, which are not described further herein in detail.

Alternatively, the impeller 3 and the loading wheel 26 may also be integrally formed.

Figure 6:
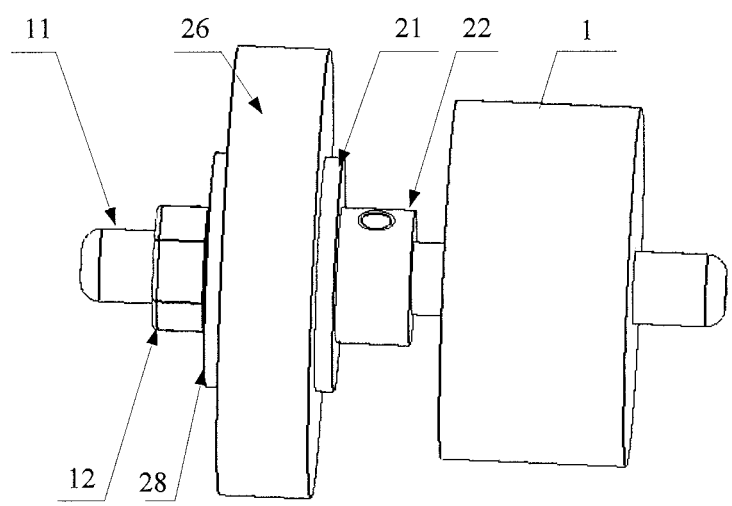
FIG. 6 illustrates another structure of the motor assembly of the embodiment of the present invention.

Referring to FIG. 6, in a second embodiment of the present invention, the inner hole 261 of the loading wheel 26 is a cylindrical hole with constant diameter. A second stop plate 28 is disposed at one end of the support portion 23 away from the first stop 21. By positioning of the second stop plate 28 along the axial direction of the rotary shaft 11, the support portion 23 can likewise be axially positioned.

The shaft sleeve and stop plate structures may be omitted. Instead, the fixing member 20 is formed as an integral structure, and only the fixing member 20 needs to be directly fixed to the rotary shaft 11.

One embodiment of the present invention further provides a motor assembly including a single phase motor 1 and a centrifugal friction clutch 2. The centrifugal friction clutch 2 is any one of the above-described centrifugal friction clutches. Since the above-described centrifugal friction clutches achieve the above-described technical results, the motor assembly employing the above-described centrifugal friction clutch can also achieve the same technical results, which are not described further herein in detail.

One embodiment of the present invention further provides a fluid driving device including an impeller 3 and a motor assembly. The motor assembly is any one of the above-described motor assemblies. Since the above-described motor assemblies achieve the above-described technical results, the fluid driving device employing the above-described motor assembly can also achieve the same technical results, which are not described further herein in detail.

All embodiments in the specification are described in a progressive way, each embodiment mainly describes the differences from other embodiments, and the same and similar parts among the embodiments can be referenced mutually.

Although the invention is described with reference to one or more embodiments, the above description of the embodiments is used only to enable people skilled in the art to practice or use the invention. It should be appreciated by those skilled in the art that various modifications are possible without departing from the spirit or scope of the present invention. The embodiments illustrated herein should not be interpreted as limits to the present invention, and the scope of the invention is to be determined by reference to the claims that follow.

The invention claimed is:

1. A centrifugal friction clutch comprising:
a fixing member for being fixed on a rotary shaft, the fixing member defining at least one guiding groove extending in a radial direction of the fixing member and passing through an outer circumferential surface of the fixing member;
at least one centrifugal block correspondingly slidably received in said at least one guiding groove; and
a loading wheel having an inner hole in which the fixing member is received, a gap between a wall of the inner hole and the outer circumferential surface of the fixing member being less than a length of said at least one centrifugal block along its sliding direction;
wherein the loading wheel is formed with latching grooves for latching with a load;
wherein the fixing member comprises:
a support portion comprising the guiding groove; and
a first stop plate for axially positioning the support portion;
wherein an elastic washer is provided at one end of each of said at least one centrifugal block toward a radial inner side of the support portion.

2. The centrifugal friction clutch of claim 1, wherein the fixing member further comprises a positioning shaft sleeve fastened to the rotary shaft, and the support portion is fixed on the positioning shaft sleeve.

3. The centrifugal friction clutch of claim 2, wherein the first stop plate and the positioning shaft sleeve are fixedly connected.

4. The centrifugal friction clutch of claim 3, wherein the positioning shaft sleeve and the first stop plate are an integral structure.

5. The centrifugal friction clutch of claim 2, wherein a part of the positioning shaft sleeve extending into a connecting hole of the support portion is of a non-circular structure, and the connecting hole is a non-circular hole matching with the non-circular structure.

6. The centrifugal friction clutch of claim 5, wherein the part of the positioning shaft sleeve extending into the connecting hole of the support portion is of a prism structure.

7. The centrifugal friction clutch of claim 1, wherein the support portion is a circular cylindrical structure with a constant diameter, the inner hole of the loading wheel is a circular inner hole matching with the support portion, and an end face of each of said at least one centrifugal block toward an outer side of the support portion is a convex arc surface.

8. The centrifugal friction clutch of claim 7, wherein the convex arc surface has the same curvature radius as the wall of the inner hole and is coaxially arranged with the inner hole of the loading wheel.

9. The centrifugal friction clutch of claim 7, wherein the inner hole of the loading wheel is a stepped hole, the support portion is disposed in a large-diameter hole of the stepped hole, and an end face of the support portion away from the first stop plate contacts a step end face of the stepped hole.

10. The centrifugal friction clutch of claim 7, wherein the inner hole of the loading wheel is a circular cylindrical hole, and one end of the support portion away from the first stop plate is provided with a second stop plate for being fixed on the rotary shaft.

11. The centrifugal friction clutch of claim 1, wherein the fixing member is an integral structure.

12. The centrifugal friction clutch of claim 1, wherein said at least one guiding grooves comprises two or more guiding grooves evenly arranged at the fixing member in an circumferential direction of the fixing member.

* * * * *